United States Patent
Goldberg et al.

(10) Patent No.: US 6,205,205 B1
(45) Date of Patent: Mar. 20, 2001

(54) METHOD AND SYSTEM FOR AFFINITY GROUP TELEPHONE SERVICE

(75) Inventors: Randy G. Goldberg, Princeton; Bruce Lowell Hanson, Little Silver; Amir M. Mane, Lincroft, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/020,931

(22) Filed: Feb. 9, 1998

(51) Int. Cl.[7] .................. H04M 1/64; H04M 11/00; H04M 3/42

(52) U.S. Cl. .................. 379/67.1; 379/49; 379/88.19; 379/156; 379/171

(58) Field of Search ................. 379/45, 49, 67.1, 379/76, 88.01, 88.05, 88.12–88.14, 88.22, 93.02, 93.07, 93.13, 93.21, 201, 202, 156, 171, 142, 210–212, 157, 372, 373, 88.19, 88.21, 88.23; 345/327; 348/1, 10–12, 13

(56) References Cited

U.S. PATENT DOCUMENTS

| | | | |
|---|---|---|---|
| 4,757,525 | * 7/1988 | Matthews et al. | 379/89 |
| 4,958,369 | * 9/1990 | Tsuchida | 379/156 |
| 5,400,393 | * 3/1995 | Knuth et al. | 379/88 |
| 5,539,817 | * 7/1996 | Wilkes | 379/230 |
| 5,644,629 | * 7/1997 | Chow | 379/142 |
| 5,764,758 | * 6/1998 | Shen | 379/372 |
| 5,835,087 | * 11/1998 | Herz et al. | 345/327 |
| 5,864,606 | * 1/1999 | Hanson et al. | 379/88.18 |
| 5,912,952 | * 6/1999 | Brendzel | 379/93.25 |
| 5,923,733 | * 7/1999 | Binns et al. | 379/88.23 |
| 5,974,413 | * 10/1999 | Beauregard et al. | 707/6 |

* cited by examiner

Primary Examiner—Fan Tsang (57) ABSTRACT

A plurality of subscribers in a telecommunications network are divided into affinity groups. Subscribers in a particular affinity group have a common interest which is different from that of subscribers in other affinity groups. That interest may a common cultural heritage, a common language preference, a common vocational or avocational interest, or the like. Each respective affinity group has associated with it a customized set of call processing characteristics, such as a distinctive dial tone, a distinctive subscriber language preference, and/or an abbreviated dialing list of other subscribers in the group. In addition, each respective affinity group can have a special broadcast message sent to the some or all of the subscribers in the group.

26 Claims, 13 Drawing Sheets

AFFINITY TABLE 120, 120' & 120"

| TELEPHONE ROUTING TABLE | | | |
|---|---|---|---|
| "A" GROUP POTS_NUMBERS | "B" GROUP POTS_NUMBERS | "C" GROUP POTS_NUMBERS | "D" GROUP POTS_NUMBERS |
| RADIO PAGER ROUTING TABLE | | | |
| "A" GROUP PAGER NUMBERS | "B" GROUP PAGER NUMBERS | "C" GROUP PAGER NUMBERS | "D" GROUP PAGER NUMBERS |
| INTERNET E-MAIL ROUTING TABLE | | | |
| "A" GROUP ADDRESSES | "B" GROUP ADDRESSES | "C" GROUP ADDRESSES | "D" GROUP ADDRESSES |
| FACSIMILE ROUTING TABLE | | | |
| "A" GROUP FAX NUMBERS | "B" GROUP FAX NUMBERS | "C" GROUP FAX NUMBERS | "D" GROUP FAX NUMBERS |
| SPEECH RECOGNITION WORD LIST | | | |
| "A" GROUP WORD LIST | "B" GROUP WORD LIST | "C" GROUP WORD LIST | "D" GROUP WORD LIST |
| ABBREVIATED DIALING TABLE | | | |
| "A" GROUP LIST | "B" GROUP LIST | "C" GROUP LIST | "D" GROUP LIST |
| SPECIAL BROADCAST MESSAGE TABLE | | | |
| "A" GROUP MESSAGE | "B" GROUP MESSAGE | "C" GROUP MESSAGE | "D" GROUP MESSAGE |
| SPECIAL DIALTONE TABLE | | | |
| "A" GROUP DIALTONE | "B" GROUP DIALTONE | "C" GROUP DIALTONE | "D" GROUP DIALTONE |
| SUBSCRIBER PREFERENCE RECORDS BUFFER | | | |
| "A" GROUP RECORDS 700 | "B" GROUP RECORDS 700 | "C" GROUP RECORDS 700 | "D" GROUP RECORDS 700 |

SUBSCRIBER'S PREFERENCE
RECORD 700

| | |
|---|---|
| 720 | TELEPHONE NUMBER AND PIN___ |
| 722 | AFFINITY GROUP SELECTION___ |
| 724 | RADIO PAGER NUMBER___ |
| 726 | E-MAIL ADDRESS___ |
| 728 | FAX NUMBER___ |
| 730 | LANGUAGE PREFERENCE___ |
| 732 | ABBREVIATED DIALING ID___ |
| 734 | HERE SPECIAL BROADCAST MESSAGE__Y__N |
| 736 | SPECIAL DIALTONE SELECTION___ |
| 738 | NEXT SPECIAL MESSAGE IN QUEUE___ |

FIG. 9

AFFINITY TABLE
120, 120' & 120"

METHOD AND SYSTEM FOR AFFINITY GROUP TELEPHONE SERVICE

TECHNICAL FIELD

This invention relates to telecommunications, and more particularly to a method and apparatus for affinity group telephone service with broadcast announcements.

BACKGROUND OF THE INVENTION

There is a need in the prior art for a telephone network which provides customized features for unique subcategories of subscribers. Subscribers having common cultural characteristics and common interests would benefit from having a customized set of call processing functions available uniquely to their group.

SUMMARY OF THE INVENTION

One aspect of the invention is segregating a plurality of subscribers in a telecommunications network into affinity groups. Subscribers in a particular affinity group have a common interest which is different from that of subscribers in other affinity groups. That interest may be a common cultural heritage, a common language preference, a common vocational or avocational interest, or the like. In accordance with the invention, each respective affinity group has associated with it a customized set of call processing characteristics, such as a distinctive dial tone, a distinctive subscriber language preference, and an abbreviated dialing list of other subscribers in the group. In addition, each respective affinity group can have a special broadcast message presented to some or all of the subscribers in the group.

The customized set of call processing characteristics and the special broadcast message are stored for all of the affinity groups in an affinity group table in the network. The affinity group table organizes subscribers into separate affinity groups. Each group includes network routing tables for subscribers in the group, a speech recognition word list for interpreting spoken dialing commands by subscribers of the group, an abbreviated dialing table for subscribers of the group, a special dialtone that is played to subscribers of the group when they go off-hook, and a special broadcast message that is played to subscribers of the group. In addition, a subscriber preference record is stored with the affinity group table for each subscriber. When changes are to be made to the affinity group table for a particular subscriber, the changes can be made by either the subscriber or by a system administrator to create a new subscriber preference record that is stored with the affinity group table. Subscribers may change their affinity group, change pager, E-mail, or FAX numbers, change the language preference, choose among alternately available dial tones, choose among alternately available special broadcast messages, or elect not to have the special broadcast messages played at all.

To change the subscriber preference record, the subscriber makes choices from a data change menu. In one embodiment, the data change menu is presented as a voice menu over the subscriber's telephone, which is managed by a voice menu server in the network. The subscriber requests the voice menu and makes the choices using the touch tone keys on the telephone. In another embodiment, the data change menu is presented as a visual display menu on the subscriber's personal computer. This visual display menu is accessed from a website menu server in the network. The data change menu is received over the internet in response to the subscriber's request, and the subscriber makes the choices using the keyboard and mouse devices on a personal computer.

In one embodiment of the invention, the affinity group table is distributed throughout the telecommunications network at control processors that control various network switches in the telecommunications network. Each control processor has a call screening index that identifies when a locally originated call is from a subscriber who is a member of one of the affinity groups. The call is then handled by an affinity group call processing program in the control processor, which refers to the affinity group table to provide the particular call processing features associated with the identified group. When changes are made to a particular subscriber's preference record, they are managed by an affinity group table update program in the control processor. An update message with the change data is prepared by the control processor and broadcast over the common channel signaling network to the other control processors in the network. The change data is used to update the respective call screening indexes and affinity group tables distributed around the telecommunications network. In this manner, all control processors will have the same version of the call screening indexes and affinity group table.

In another embodiment of the invention, the affinity group table is located at an affinity group network platform in the telecommunications network, that includes a control processor that controls a special network switch. Each of the control processors at other network switches throughout the network has the call screening index that identifies when a locally originated call is from a subscriber who is a member of one of the affinity groups. Control of the call is then passed over the common channel signaling network to the affinity group platform. There, the call is then handled by the affinity group call processing program in the control processor, which refers to the affinity group table to provide the particular call processing features associated with the identified group.

The discussion in this Summary and the following Brief Description of the Drawings, Detailed Description, and drawings only deal with examples of this invention and are not to be considered in any way a limitation on the scope of the exclusionary rights conferred by a patent which may issue from this application. The scope of such exclusionary rights is set forth in the claims at the end of this application.

DETAILED DESCRIPTION OF THE EMBODIMENTS

The invention disclosed herein enables a community of interest to have access to common call processing features, including abbreviated dialing within its community, combined with special broadcast messages that are delivered to all members of the affinity group without the need to access a special mailbox. The invention combines telephone features including abbreviated dialing, language preferences, and special broadcast messages to all members of the community when they pick up their telephone. Features such as a special dial tone can be provided as a customized call processing characteristics for the affinity group.

Figure 1A:
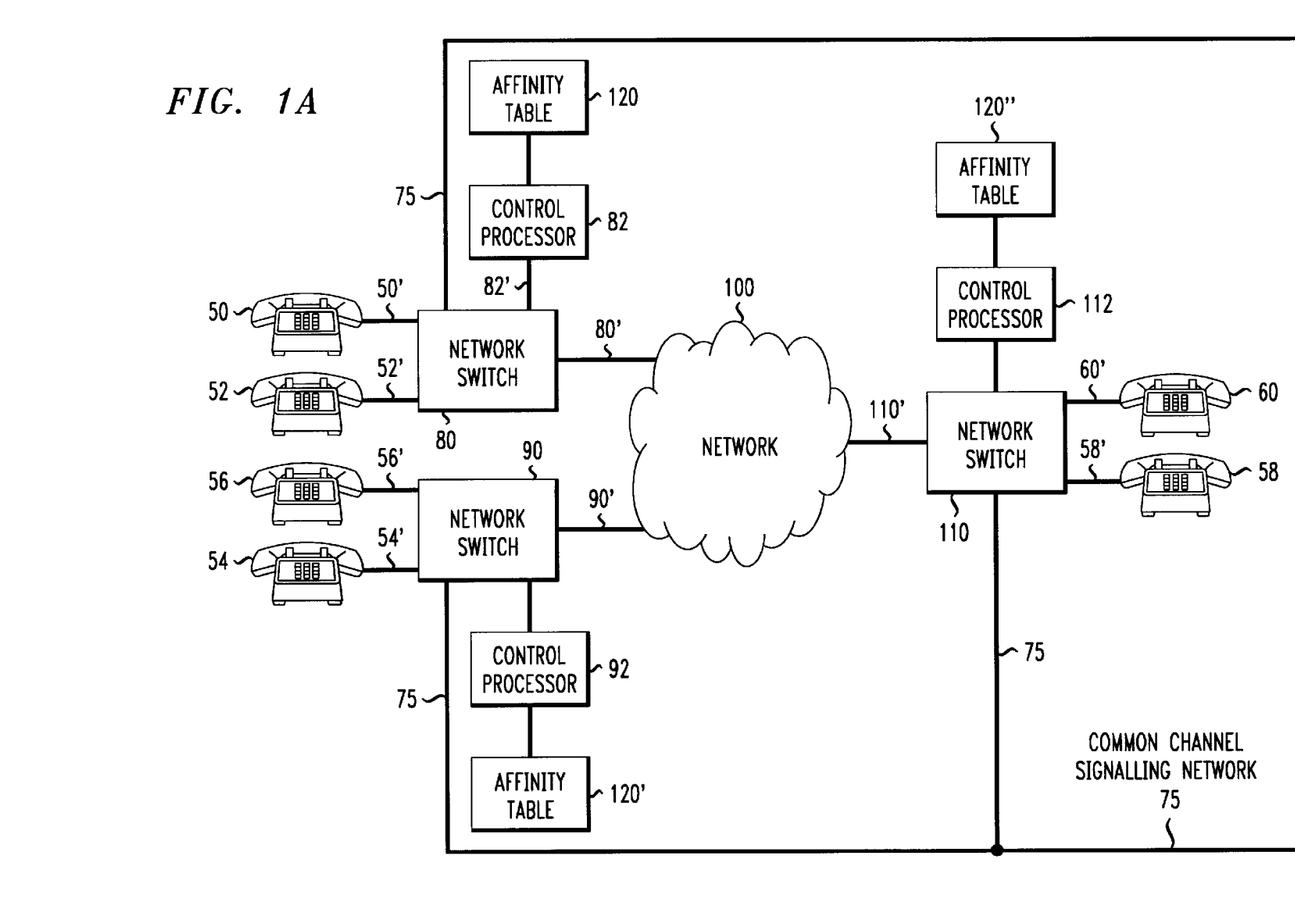
FIG. 1A is a simplified block diagram of an exemplary telecommunications network architecture employing the principles of the present invention in a distributed affinity group table embodiment.

FIG. 1A is a simplified block diagram of an exemplary telecommunications network architecture employing the principles of the present invention in a distributed affinity group table embodiment. A network is shown in FIG. 1A including network switches 80, 90, and 110 which are connected by the common channel signaling network 75 to exchange control signals to setup and control calls in the network. Network switches 80, 90, and 110 are also respectively connected over lines 80', 90', and 110' to the network 100, over which voice calls are exchanged. Control processor 82 controls the network switch 80 over line 82', control processor 92 controls the network switch 90, and control processor 112 controls the network switch 110. Phone 50 and phone 52 are respectively connected by means of lines 50' and 52' to the network switch 80. Phones 56 an 54 are connected by means of lines 56' and 54' respectively, to the network switch 90. Phones 58 and 60 are respectively connected by means of lines 58' and 60' to network switch 110. In accordance with the invention, an affinity table 120 is associated with the control processor 82, which is shown in greater detail in FIG. 2.

Figure 2:
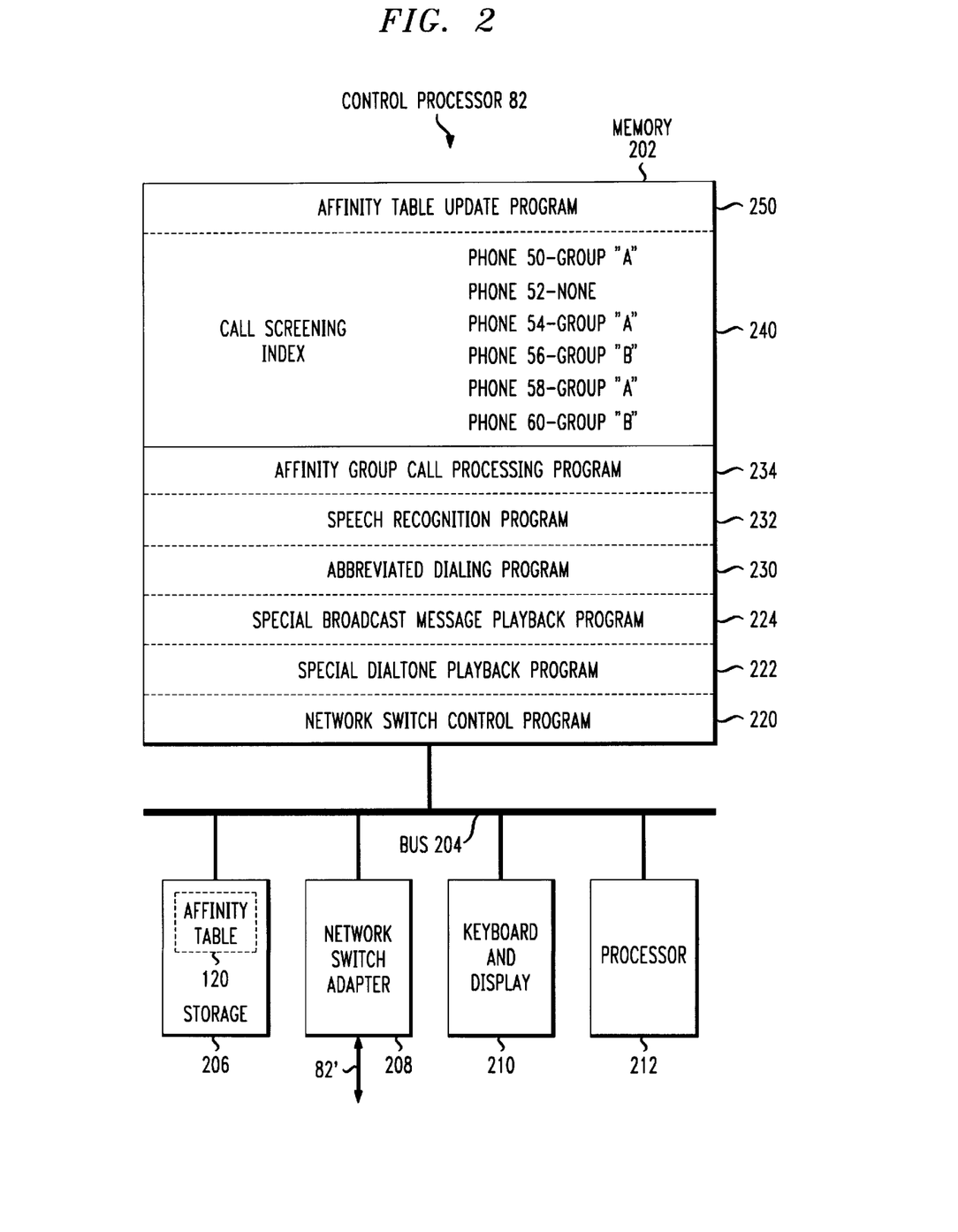
FIG. 2 is a functional block diagram of a control processor for a network switch.

The control processor 82 of FIG. 2, incudes the memory 202 connected by means of the bus 204 to the storage 206, the network switch adaptor 208, the keyboard and display 210, and the processor 212. The affinity table 120 is stored in the storage 206. The network switch adaptor 208 is connected by means of line 82' to the network switch 80 of FIG. 1A.

Figure 4:
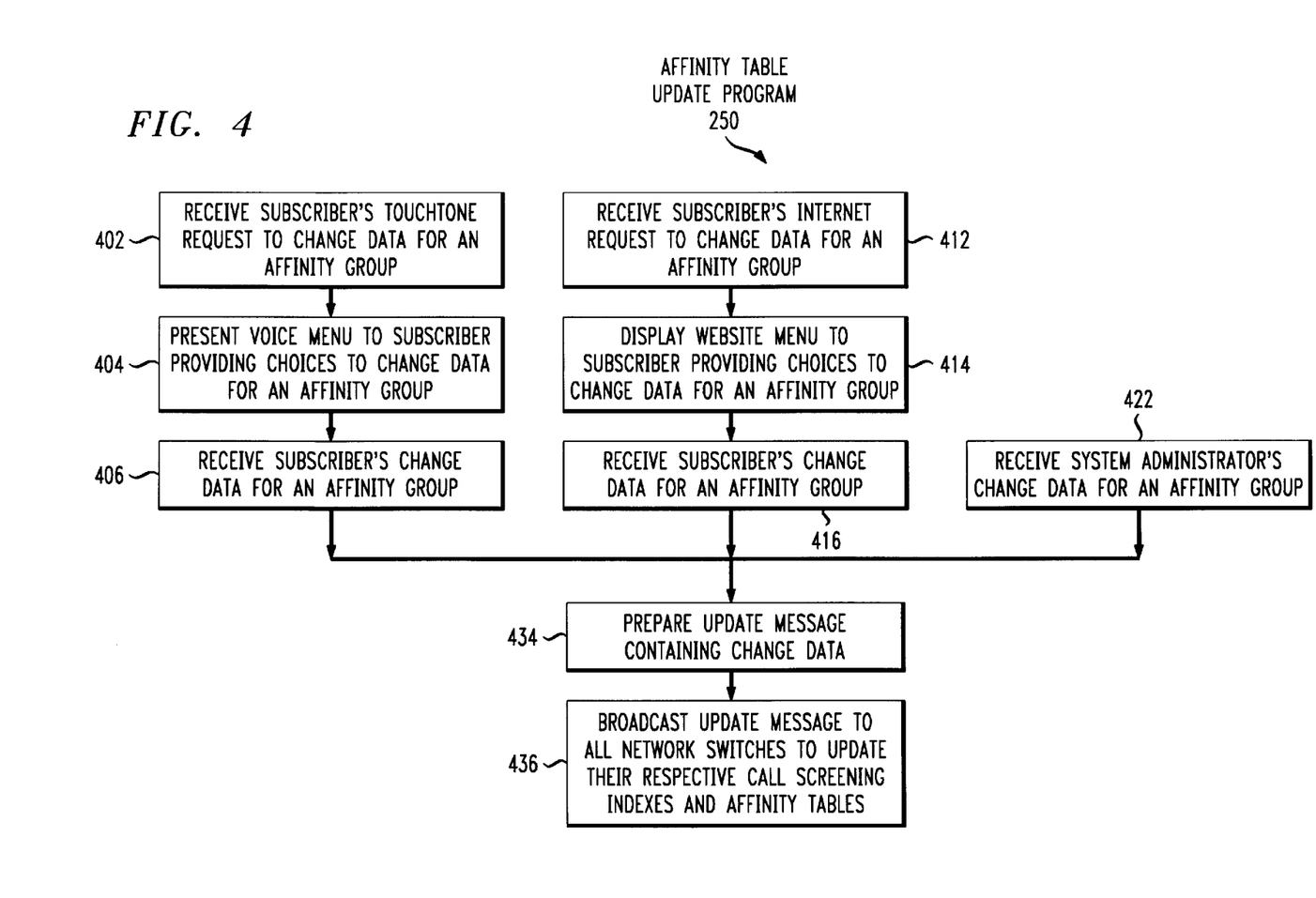
FIG. 4 is a flow diagram of the affinity group table update program.

The memory 202 of the control processor 82 shown in FIG. 2, stores the affinity table update program 250, which is shown in greater detail in the flow diagram of FIG. 4. Also stored in the memory 202, is the call screening index 240, which identifies each of the respective phones 50, 52, 54, 56, 58 and 60 as being members of respective affinity groups. For example, phones 50, 54, and 58 are members of affinity group "A". This is shown by the shaded phone boxes in FIG. 1A. Phones 56 and 60 are identified in the call screening index 240 of FIG. 2, as members of affinity group "B". Phone 52 is not a member of an affinity group. Also stored in the memory 202 of FIG. 2, is the affinity group call processing program 234, which is shown in greater detail in the flow diagram of FIG. 5. Also included in the memory 202 of FIG. 2, is the speech recognition program 232, the abbreviated dialing program 230, the special broadcast message playback program 224, the special dialtone playback program 222, and the network switch control program 220. The programs stored in the memory 202 of FIG. 2 are sequences of executable instructions which, when executed in the processor 212, carry out the methods of the respective programs.

Figure 3:
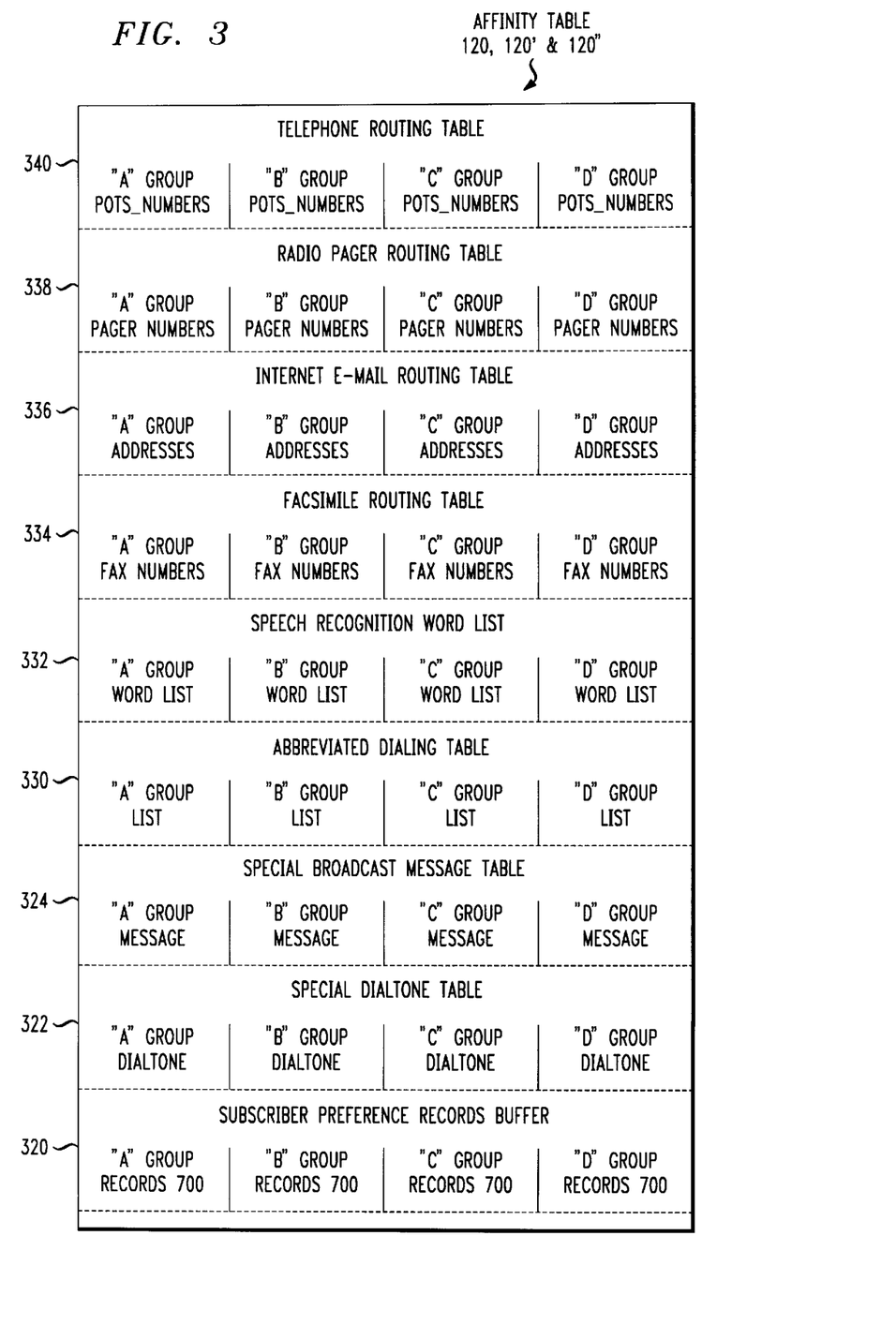
FIG. 3 illustrates an affinity group table.

FIG. 3 illustrates an affinity group table 120. The affinity group table 120 is replicated as the affinity group table 120' for the control processor 92 in FIG. 1A and is further replicated as the affinity group table 120" in the control processor 112 of FIG. 1A The affinity table 120 of FIG. 3 includes data for the telephone routing table 340, allocated into the respective affinity groups provided in the network. In the example shown in FIG. 3, four affinity groups are represented, "A", "B", "C", and "D". In accordance with the invention, the method of the invention segregates the plurality of subscribers in the telecommunications network into several affinity groups. Subscribers in a first affinity group have a common interest which is different from that of subscribers in the other affinity groups. The interest may be a common cultural heritage, a language preference, vocational or avocational interest, and the like. The segregation of subscribers into respective affinity groups may be done by the subscriber selecting a particular affinity group, using a voice menu presented by the telecommunications network or alternately by using a visual display menu presented by the network. Alternately, the segregation of a subscriber into a particular affinity group may be defined by a system administrator in the telecommunications network in response to a sponsoring group such as a fraternal organization or a commercial entity. In accordance with the invention, the method stores in the telecommunication network, and in particular in the affinity table 120, a first call processing characteristic for a first group of subscribers in a first affinity group. The call processing characteristic can be a distinctive dial tone which is different from the dial tones provided in other affinity groups. As an example, if the affinity group is composed of the fans of a particular professional football team, the distinctive dial tone may be the fight song of the team (" . . . on to Victory!"). Alternately, the call processing characteristic can be a distinctive subscriber language preference which may be different from those for other affinity groups. Alternately, the call processing characteristic can be an abbreviated dialing list for the members or subscribers of a particular affinity group. In accordance with the invention, a special broadcast message can be provided to subscribers of the affinity group when they pick up the telephone.

Figure 7:
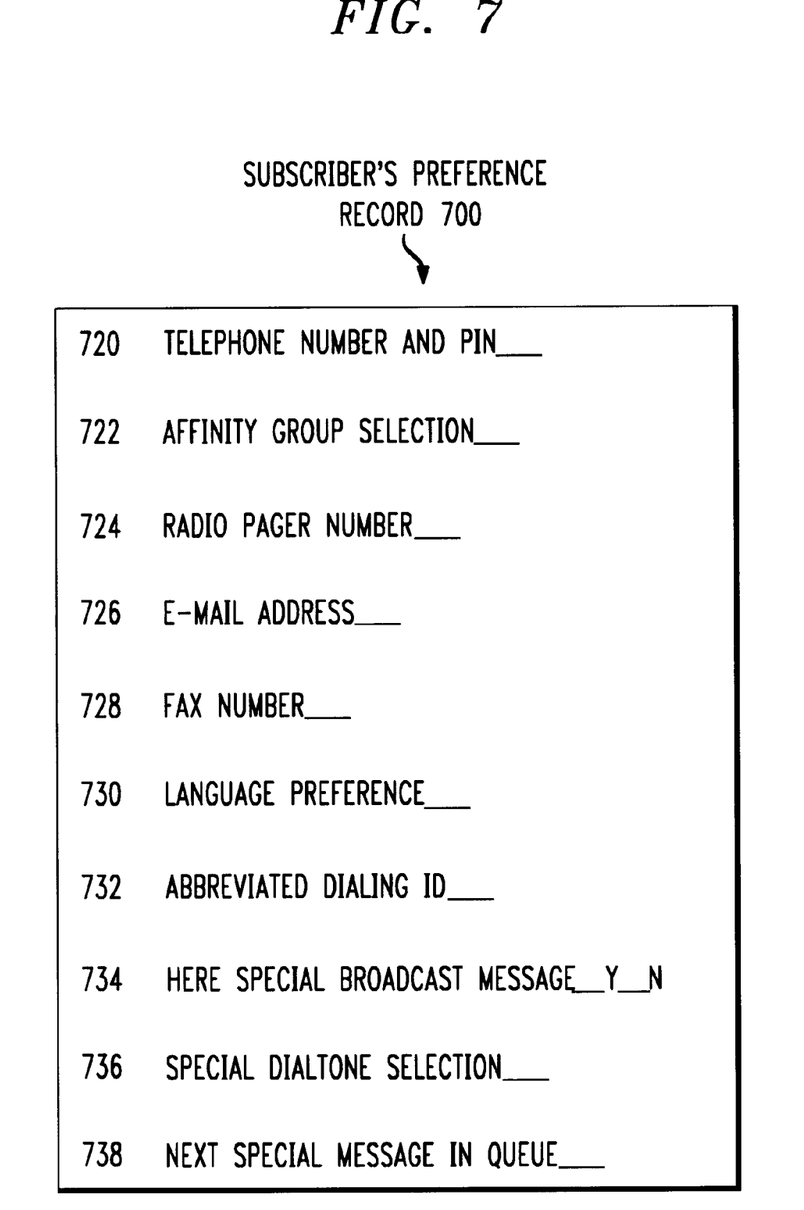
FIG. 7 illustrates a subscriber's preference record.

The affinity table 120 of FIG. 3 includes a telephone routing table 340 which has plain old telephone system (POTS) numbers for all of the subscribers in each respective affinity group. Also included in the affinity table 120 is a radio pager routing table 338 which contains the pager numbers for subscribers in each respective affinity group. Also in the affinity table 120 is an Internet E-mail routing table 336 which contains the Internet E-mail addresses for the subscribers in each respective affinity group. Also included in the affinity table 120 is a facsimile routing table 334 which contains the fax numbers of subscribers in each respective affinity group. Also in the affinity table 120 is a speech recognition word list which provides unique words, perhaps in a preferred language, for use by the subscribers in each respective affinity group, to speak commands in their respective telephones to the telecommunications network. Also provided in the affinity table 120 is an abbreviated dialing table 330 containing abbreviated dialing lists for subscribers in each respective affinity group. Also provided in the affinity table 120 is a special broadcast message table 324 which provides a special broadcast message to be played to subscribers in each respective affinity group. Also provided in the affinity table 120 is a special dialtone table 322 which stores a special dialtone to be played to subscribers in each respective affinity group when they go off-hook. Also provided in the affinity table 120 is a subscriber preference records buffer 320 which contains the subscriber preference records 700 containing profile information for each subscriber in each respective affinity group. Details of the format for the subscriber preference record 700 is shown in FIG. 7.

FIG. 4 is a flow diagram of the affinity group table update program 250. There are three ways to update the affinity table 120. The first way is to receive a subscriber's touch tone request to change data for an affinity group, in step 402. The second way is to receive the subscriber's Internet request to change data for an affinity group, in step 412. The third way is to receive the system administrator's change data for an affinity group, in step 422.

Figure 1B:
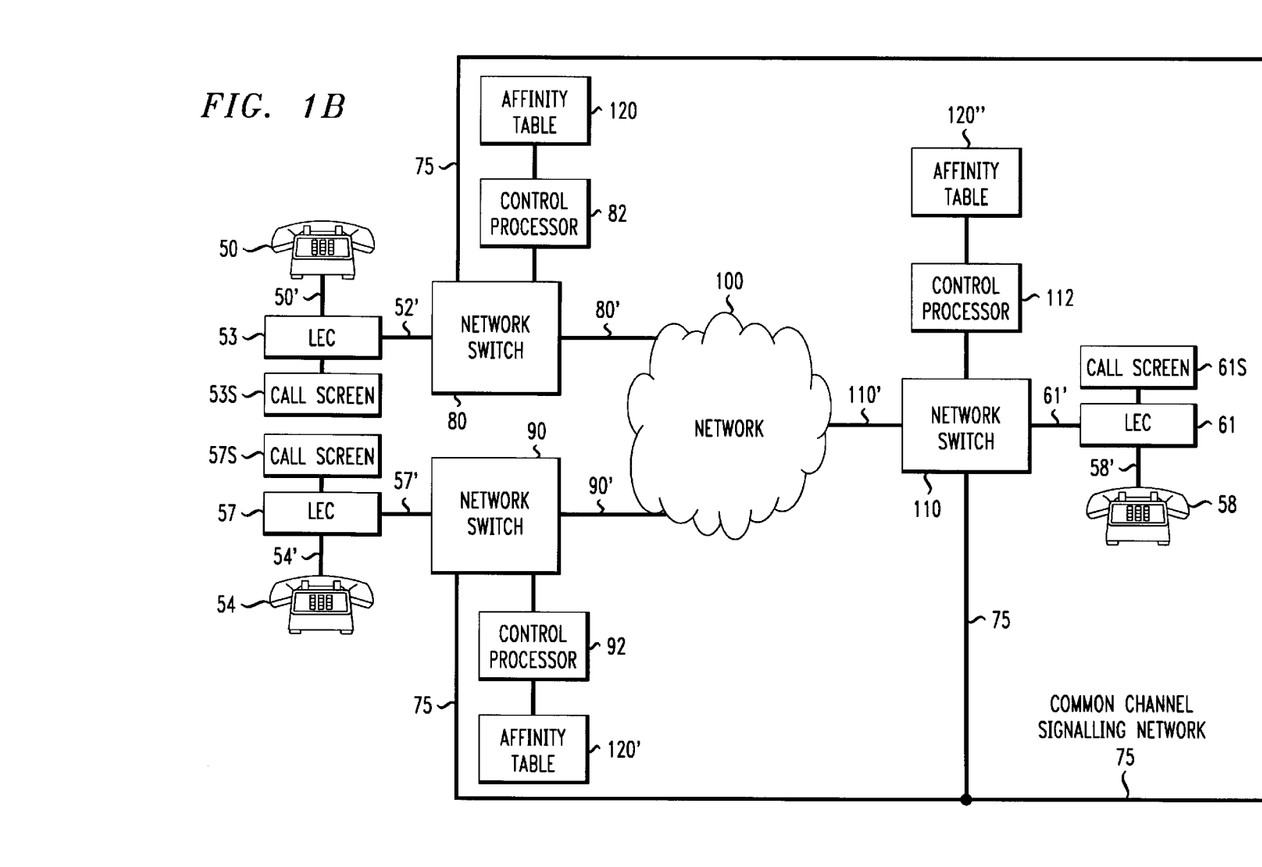
FIG. 1B shows an alternate embodiment of the block diagram of FIG. 1A, showing the relationship of the network to local exchange carriers.
Figure 1C:
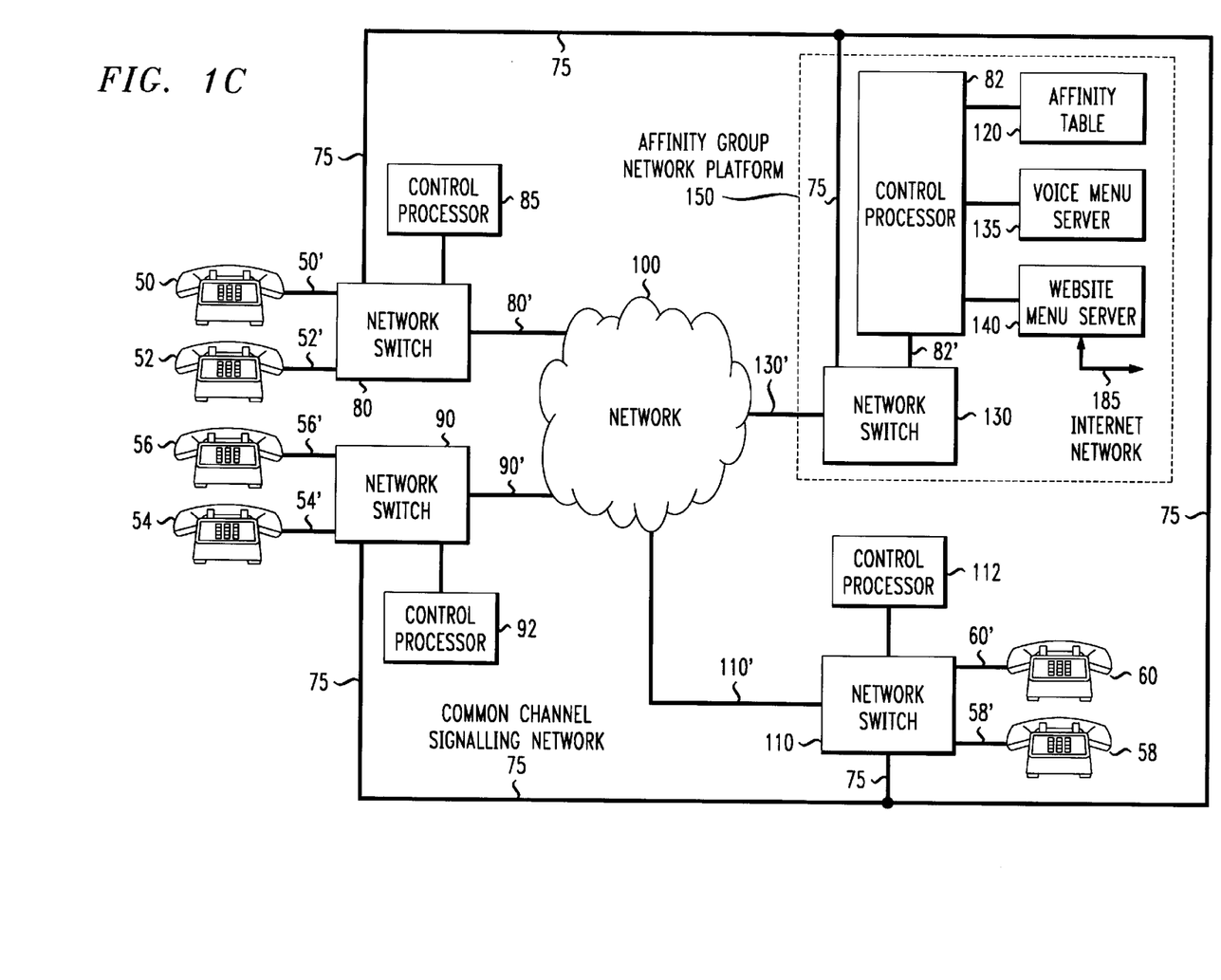
FIG. 1C shows an alternate embodiment of the block diagram of FIG. 1A, showing an affinity group network platform embodiment.

If the network receives the subscriber's touch tone request to change data for an affinity group in step 402 of FIG. 4, then the network presents a voice menu to the subscriber providing choices to change data for an affinity group, in step 404. FIG. 1E shows another view of the network diagram of FIG. 1A, which includes the voice menu server 135 which can present the voice menu to the subscriber in step 404. The voice menu server 135 is connected by line 135' to the network 100. Then in step 406 of FIG. 4, the network receives the subscriber's change data for an affinity group. The method then flows to step 434.

Figure 6:
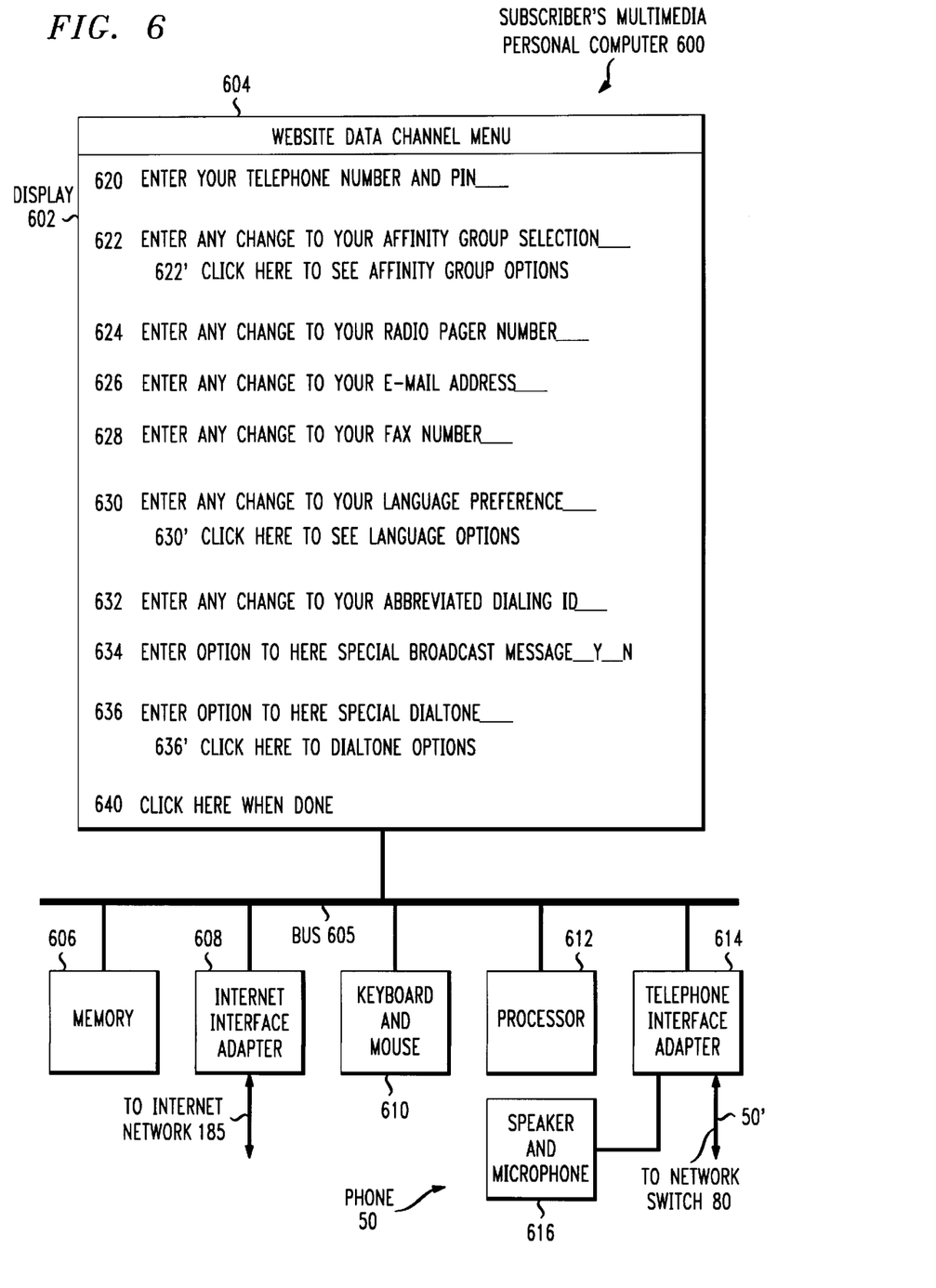
FIG. 6 is a block diagram of a subscriber's multimedia personal computer displaying a website data change menu.

In the alternative, if the network receives a subscriber's Internet request to change for an affinity group in step 412 of FIG. 4, then the website menu server 140 in the network of FIG. 1E, provides a website menu which is displayed to the subscriber and provides the subscriber with choices to change data for an affinity group as shown in step 414 of FIG. 4. The website menu server 140 is connected by line 140' to the network 100 and is also connected to the internet network 185. The subscriber's multimedia personal computer 600 which displays the website data change menu 604 is shown in FIG. 6. Then, in step 416 of FIG. 4, the network receives the subscriber's change data for an affinity group. The method then flows to step 434.

In the alternative, if the network receives the system administrator's change data for an affinity group in step 422, the method also flows to step 434.

In step 434 of FIG. 4, the network prepares the update message containing the change data. Then in step 436, an update message is broadcast to all network switches in the network of FIG. 1A or FIG. 1E, to update their respective call screening indexes 240 and their respective affinity tables 120, 120', and 120". This can be done on a regularly scheduled basis.

Figure 5:
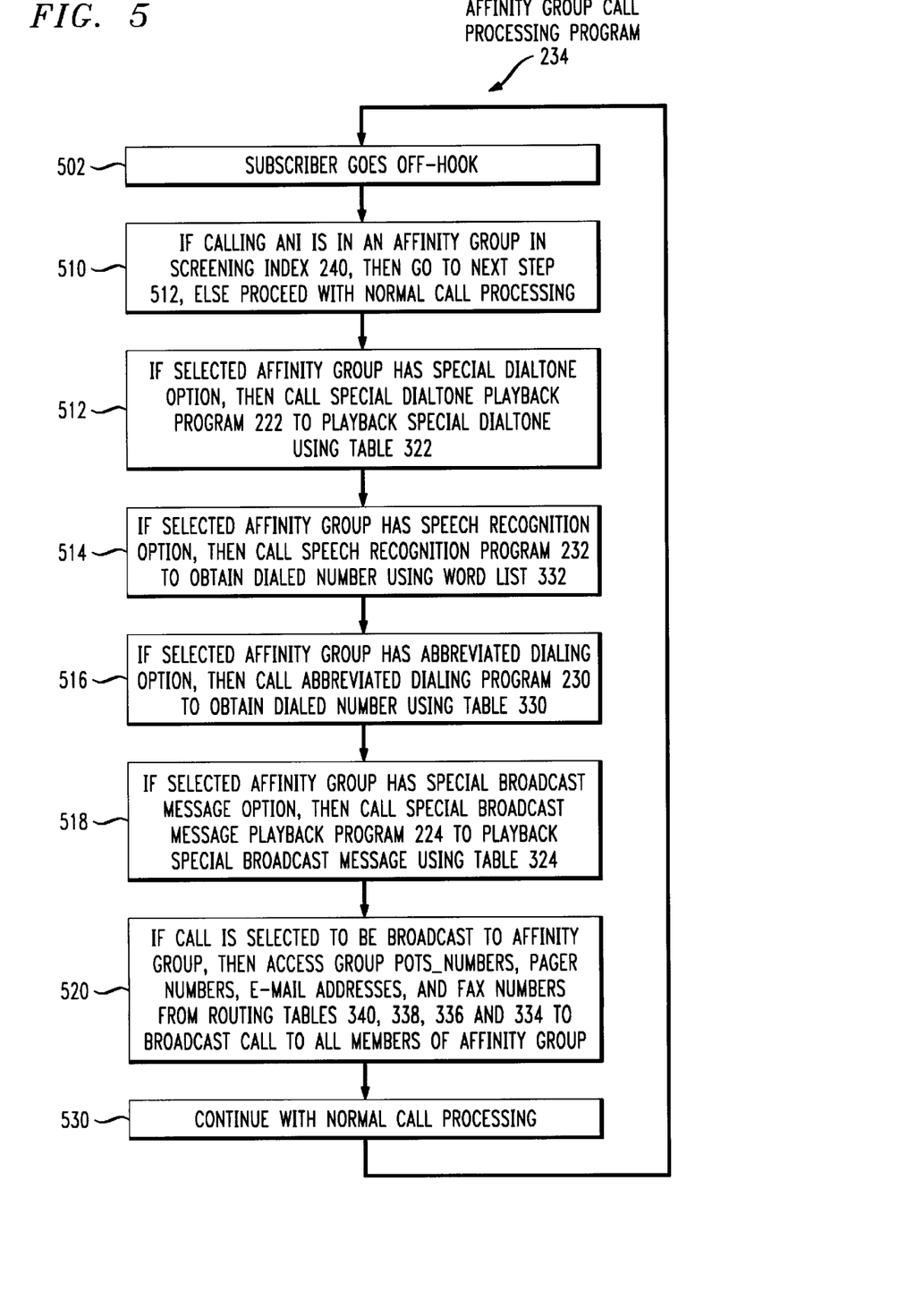
FIG. 5 is a flow diagram of the affinity group call processing program.

FIG. 5 illustrates a flow diagram of the affinity group call processing program 234. When a subscriber goes off-hook, Step 502 receives the call and then passes to step 510. Step 510 determines if the calling automatic number identification (ANI) number of the caller is in an affinity group as determined by the screening index 240. If it is, then the method flows to step 512. Alternately, the method proceeds with normal call processing. In step 512, if the selected affinity group has a special dialtone option as determined by the affinity table 120, then the special dialtone playback program 222 is called to playback the special dialtone using table 322. Next, step 514 determines if the selected affinity group has a speech recognition option, as determined by the affinity table 120. If it does, then the speech recognition program 232 is called to obtain the dialed number spoken by the caller, using the word list 332. Then step 516 determines if the selected affinity group has an abbreviated dialing option. If it does, then the abbreviated dialing program 230 is called to obtain the dialed number using the abbreviated dialing table 330. Then step 518 determines if the selected affinity group has a special broadcast message option as determined by the affinity table 120. If it does, then the special broadcast message playback program 224 is called to playback the special broadcast message using table 324.

Step 520 determines if the caller has selected to broadcast the call to all of the other subscribers in the affinity group. If the caller has made this selection, then step 520 accesses the POTS numbers, the pager numbers, the E-mail addresses, and the fax numbers for the affinity group, from the routing tables 340, 338, 336 and 334 in the affinity table 120, in order to broadcast the caller's message to all subscribers of the affinity group. Then the method passes to step 530 which continues with normal call processing and the method in the flow diagram of FIG. 5 passes back to step 502, waiting to receive the next locally originated call.

Figure 1D:
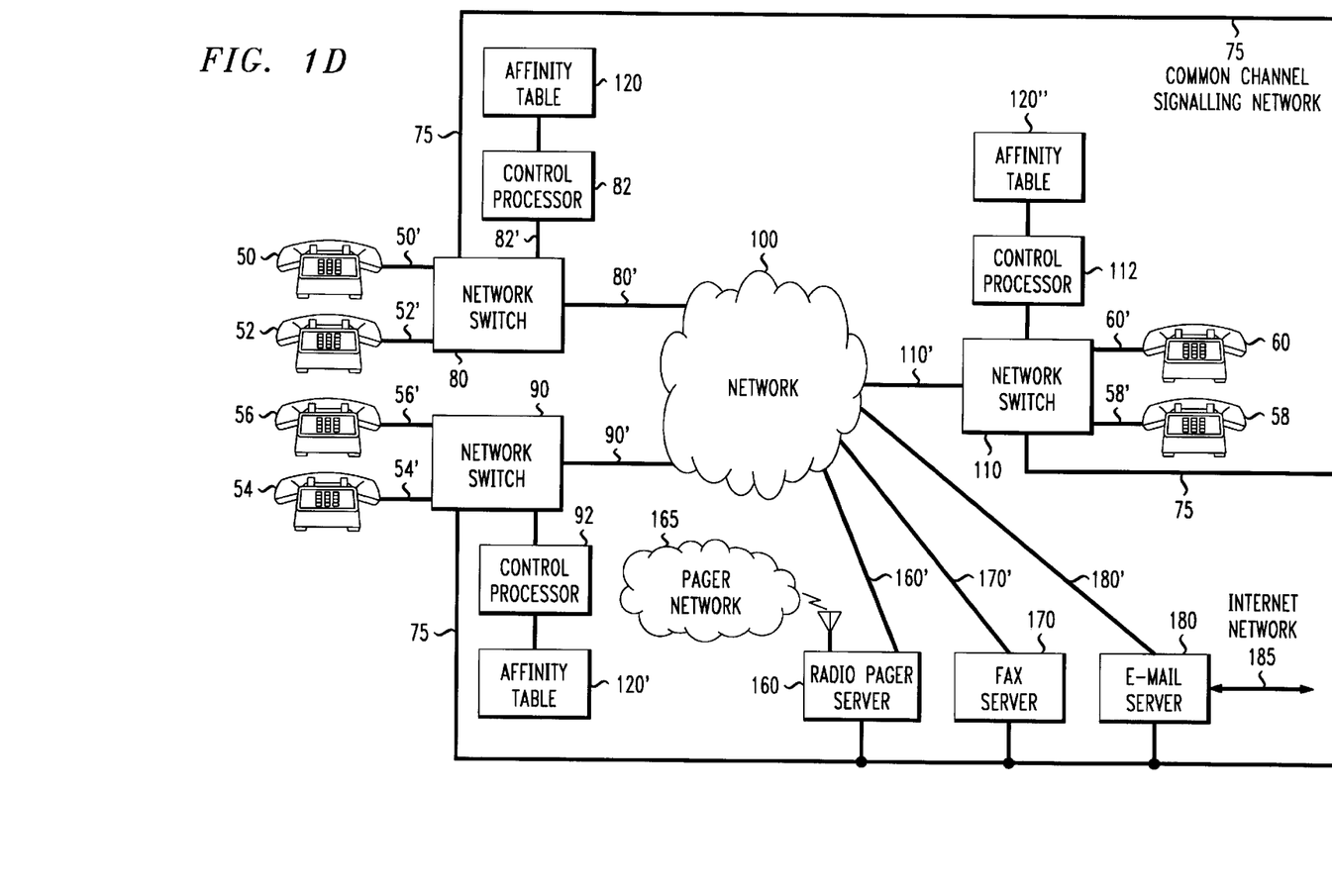
FIG. 1D shows an alternate embodiment of the block diagram of FIG. 1A, showing a radio pager server, a fax server, and an E-mail server.
Figure 1E:
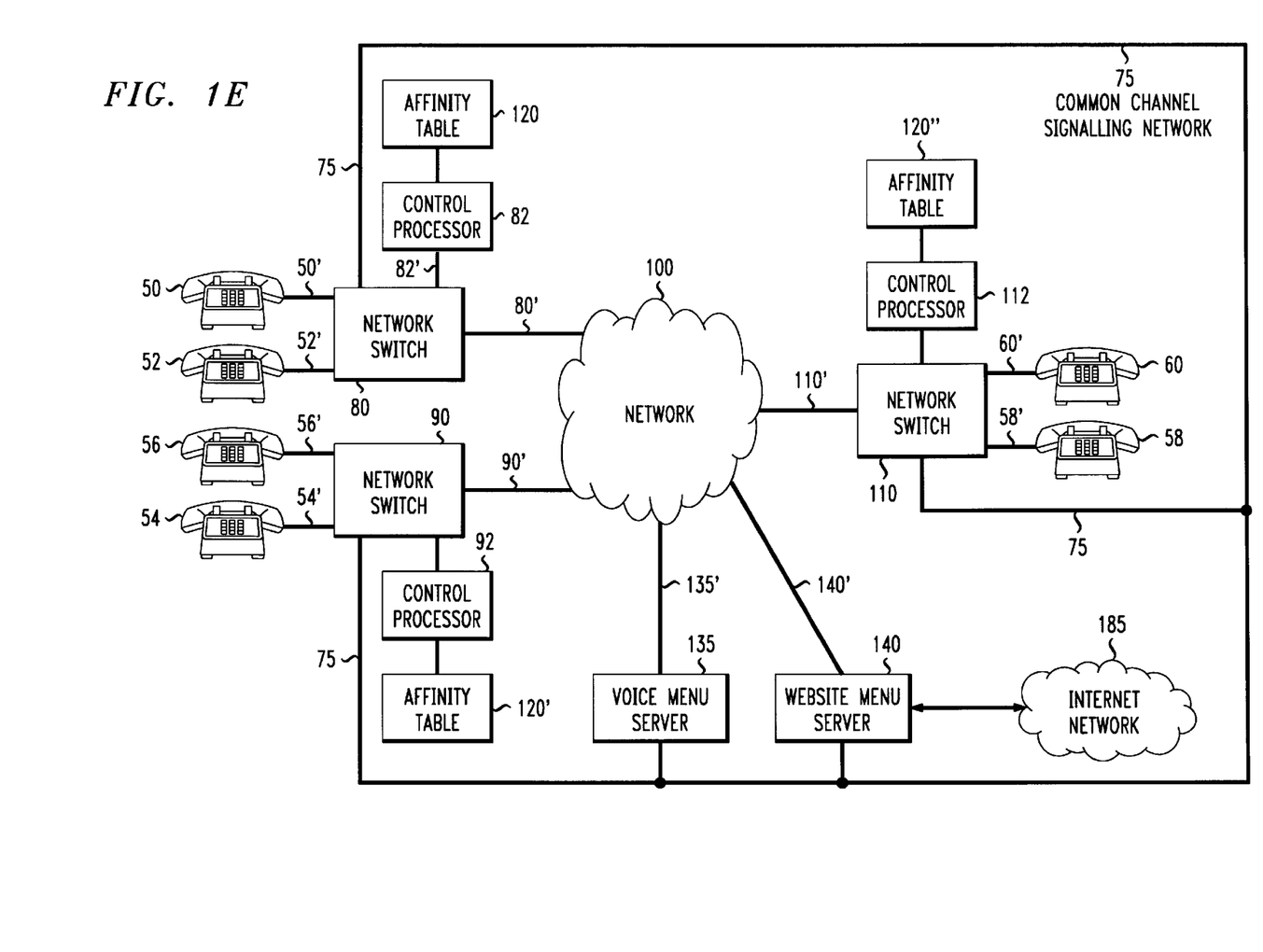
FIG. 1E shows an alternate embodiment of the block diagram of FIG. 1A, showing a voice menu server and a website menu server.

FIG. 1D is another view of the network shown in FIG. 1A, showing the radio pager server 160, the fax server 170 and the E-mail server 180, which provides broadcast services for pager messages, facsimile messages, and E-mail messages sent by broadcast by the caller in step 520 of FIG. 5. The radio pager server 160, the fax server 170 and the E-mail server 180, are respectively connected by lines 160', 170' and 180' to the network 100. The radio pager server 160 is connected by an antenna to the radio pager network 165. The E-mail server 180 is connected to the internet network 185.

FIG. 6 shows a block diagram of the subscriber's multimedia personal computer 600, which includes the phone 50 shown in FIG. 1A. The subscriber's personal computer 600 includes the display 602 which displays the website data change menu 604. The display 602 is connected by means of the bus 605 to the memory 606, the Internet interface adapter 608, the keyboard and mouse 610, the processor 612, and the telephone interface adapter 614. The telephone interface adapter 614 is connected by means of the telephone line 50' to the network switch 80 in FIG. 1A and FIG. 1E. The Internet interface adapter 608 is connected to the Internet network 185 which is connected to the website menu server 140 in FIG. 1E. The speaker and microphone 616 are connected to the telephone interface adapter 614, and constitute the phone 50 shown in FIG. 1A and FIG. 1E. The subscriber's multimedia personal computer 600 is optional for using the invention.

The website data change menu 604 is transmitted from the website menu server 140 of FIG. 1E, over the Internet network 185, to the subscriber's multimedia personal computer 600 in FIG. 6. The website data change menu 604 includes a menu of options which the subscriber may select to change the subscriber's preference record 700 shown in FIG. 7. The subscriber's preference record 700 after being updated by the personal computer 600 of FIG. 6, is transmitted to the website menu server 140 of FIG. 1E, where it is then distributed to the affinity table 120, 120' and 120" to update the respective affinity tables in the network.

The website data change menu 604 includes a selection point 620 to enter the subscriber's telephone number and personal identification number (PIN). Selection 622 allows the subscriber to enter any change to the affinity group selection. The subscriber may click the mouse pointing device at location 622' to see the affinity group options available. Selection 624 allows the subscriber to change the radio pager number. Selection 626 allows the subscriber to change the E-mail address. Selection 628 allows the subscriber to change the facsimile number. Selection 630 allows the subscriber to change the language preference. The subscriber may click the mouse indicator at location 630' to see the language options available. Selection 632 allows the subscriber to change the abbreviated dialing ID. Selection 634 allows the subscriber to elect whether or not to hear the special broadcast message sent to the subscriber from the network for the subscriber's affinity group. Selection 636 allows the subscriber to select which special dialtone to hear. By clicking the mouse indicator on location 636', the subscriber may listen to the various dialtone options before making the selection 636. After the subscriber is done making changes in the website data change menu 604, the subscriber clicks the mouse indicator at location 640. This assembles the change data in the subscriber's preference record 700 shown in FIG. 7, which is transmitted over the Internet network 185 to the website menu server 140, where it is distributed to the affinity tables 120, 120', and 120", over the common channel signaling network 75.

The subscribers preference record 700 of FIG. 7 includes the subscriber's telephone number and personal identification number (PIN) 720, the subscriber's affinity group selection 722, the radio pager number 724, the E-mail address 726, the facsimile number 728, the language preference 730, the abbreviated dialing ID 732, whether or not to hear the special broadcast message 734, which special dialtone to hear 736, and the number of the next message 738 in the special broadcast message queue, that has not yet been heard by the subscriber.

Figure 8:
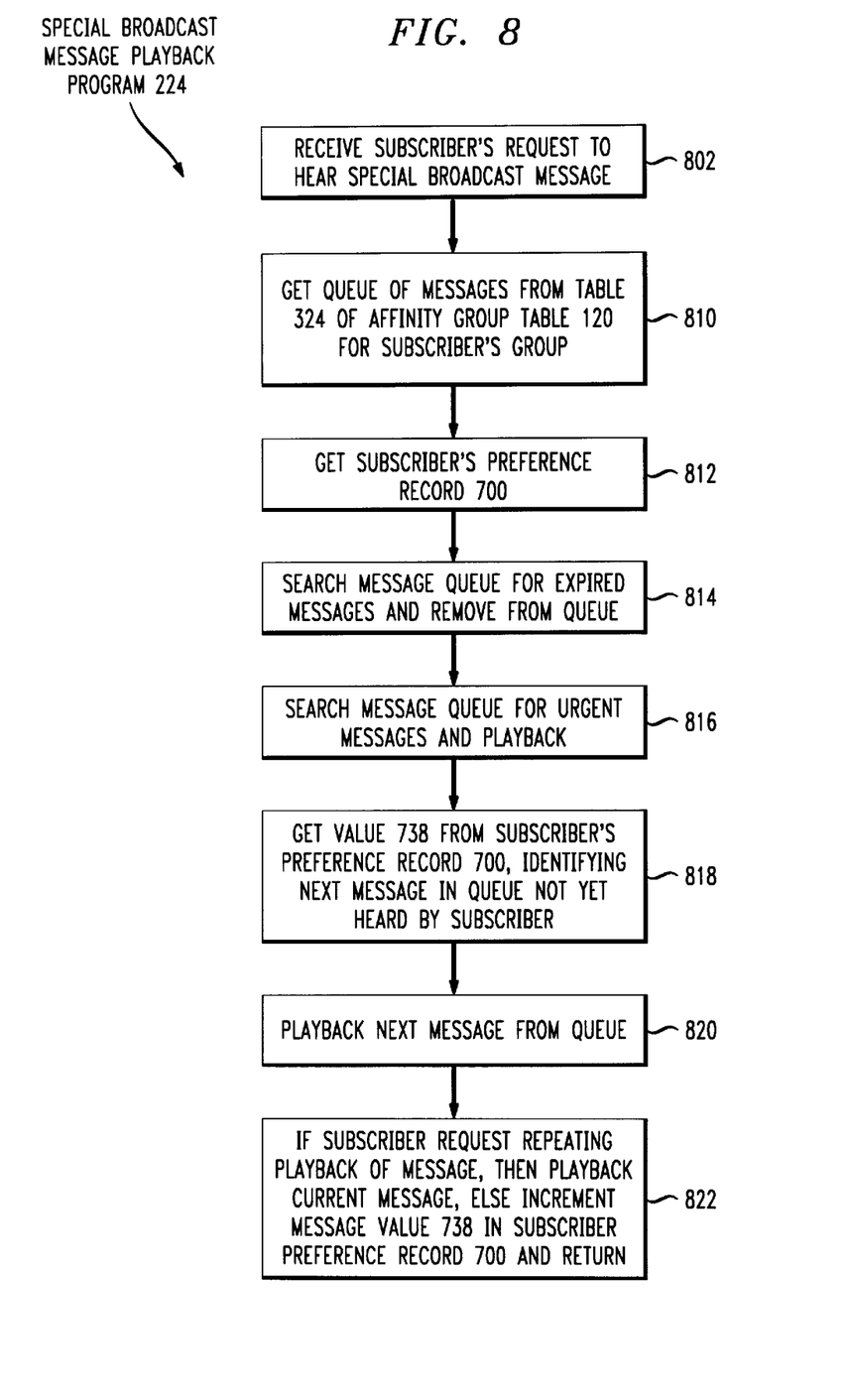
FIG. 8 is a flow diagram of the special broadcast message playback program.
Figure 9:
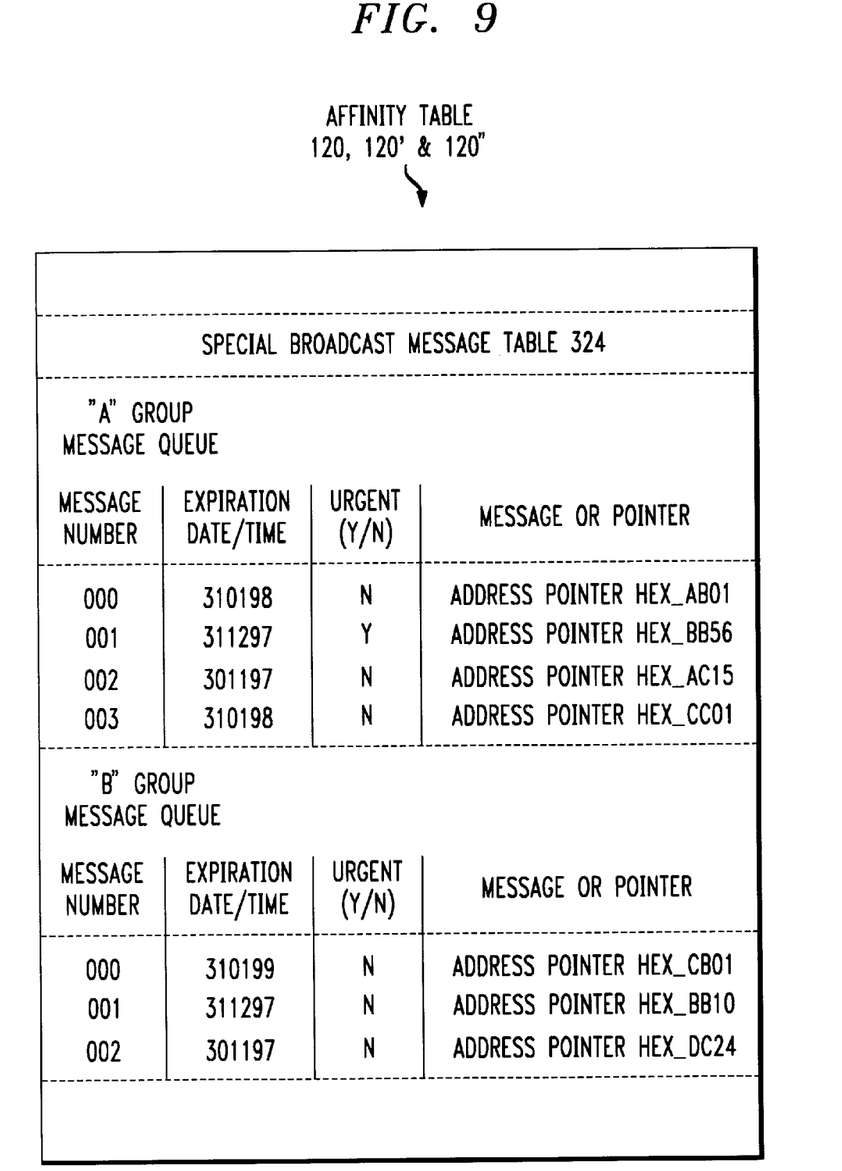
FIG. 9 illustrates an example of the special broadcast message table.

FIG. 8 is a flow diagram of the special broadcast message playback program 224. Step 802 receives the subscriber's request to hear one of the special broadcast messages in the message queue. The request can be from the subscriber's touchtone keys. FIG. 9 illustrates an example of two message queues in the special broadcast message table 324. Step 810 of FIG. 8 gets the queue of messages from table 324 for the subscriber's group. Then step 812 gets the subscriber's preference record 700. Step 814 searches the message queue for expired messages and removes them from the queue. For example, message number "002" in the "A" group message queue of FIG. 9 is an expired message which would be removed by step 814. This can also be done on a periodic schedule. Then step 816 searches the message queue for urgent messages and plays them first. For example, message number "001" in the "A" group message queue of FIG. 9 is an urgent message which would be played first by step 816. Then step 818 gets the value 738 identifying the next message in the queue not yet heard by the subscriber, accessing it from the subscriber's preference record 700. This value 738 identifies the next message. Then step 820 plays back the message from the queue. The message may be stored as direct digital data in the message queue, or an address pointer it may be stored in the message queue that points to a data module containing the message. The data module may be an interactive voice response module that may contain both digitized voice recordings and executable code. Then step 822 provides that if the subscriber requests repeating the playback of the message. the current message is played back. The request can be made by, the subscriber's touchtone keys. Otherwise, step 822 increments the message value 738 and returns.

FIG. 1B is an alternate view of the network shown in FIG. 1A, wherein a local exchange carrier (LEC) 53 connects the phone 50 to the network switch 80, an LEC 57 connects the phone 54 to the network switch 90, and an LEC 61 connects the phone 58 to the network switch 110. A screen index such as 240, may be provided in each LEC to identify subscribers who are members of an affinity group, and to treat calls as hot line calls by connecting them through to a network switch for processing as described above. FIG. 1B shows LEC 53 with call screen 53S, LEC 57 with call screen 57S, and LEC 61 with call screen 61S, which identify subscribers who are members of an affinity group, and which forward the call through the respective associated LEC on a hot line or cut-through line to the respective network switch 80, 90, or 110.

FIG. 1C shows an alternate embodiment of the network shown in FIG. 1A and FIG. 1E, where an affinity group network platform 150 is the site for the affinity table 120, the voice menu server 135, and the website menu server 140. The control processor 82 in conjunction with the network switch 130 in the network platform 150, carries out the operations discussed above for managing the affinity groups in the telecommunications network. Line 103' connects the network switch 130 to the network 100.

Various illustrative examples of the invention have been described in detail. In addition, however, many modifications and changes can be made to these examples without departing from the nature and spirit of the invention.

What is claimed is:

1. A telecommunications method, comprising:

segregating a plurality of subscribers in a telecommunications network into at least a first affinity group;

storing in said telecommunications network a first call processing characteristic for first subscribers in said first affinity group, wherein said first call processing characteristic is a dial tone which is different from that of other call processing characteristics associated with subscribers outside of said first affinity group; and executing in said telecommunications network said first call processing characteristic when one of said first subscribers places a call.

2. The telecommunications method of claim 1, wherein subscribers in said first affinity group have a common interest which is different from that of subscribers outside of said first affinity group.

3. The telecommunications method of claim 1, wherein:

said segregating step being defined for at least one subscriber of said plurality by selection by said one subscriber.

4. The telecommunications method of claim 1, wherein:

said segregating step being defined for at least one subscriber of said plurality by selection by said one subscriber from a voice menu presented by said telecommunications network.

5. The telecommunications method of claim 1, wherein:

said segregating step being defined for at least one subscriber of said plurality by selection by said one subscriber from a visual display menu.

6. The telecommunications method of claim 1, wherein:

said segregating step being defined for at least one subscriber of said plurality by selection by a system administrator in said telecommunications network.

7. The telecommunications method of claim 1, wherein:

said first call processing characteristic is a subscriber language preference which different from that of call processing characteristics associated with subscribers outside of said first affinity group.

8. The telecommunications method of claim 1, wherein:

said first call processing characteristic is an abbreviated dialing list which different from that of call processing characteristics associated with subscribers outside of said first affinity group.

9. The telecommunications method of claim 1, wherein;

said first call processing characteristic is a special broadcast message which is different from that of call processing characteristics associated with subscribers outside said first affinity group.

10. A telecommunications method, comprising:

segregating a plurality of subscribers in a telecommunications network into at least a first affinity group;

storing in said telecommunications network a first call processing characteristic including a first broadcast message for first subscribers in said first affinity group, wherein said first call processing characteristic is a dial tone which is different from that of other call processing characteristics associated with subscribers outside of said first affinity group; and executing in said telecommunications network said first call processing characteristic including transmitting said first message when one of said first subscribers places a call.

11. The telecommunications method of claim 10, wherein subscribers in said first affinity group have a common interest which is different from that of subscribers outside of said first affinity group.

12. The telecommunications method of claim 10, wherein:

said segregating step being defined for at least one subscriber of said plurality by selection by said one subscriber.

13. The telecommunications method of claim 10, wherein:

said segregating step being defined for at least one subscriber of said plurality by selection by said one subscriber from a voice menu presented by said telecommunications network.

14. The telecommunications method of claim 10, wherein:

said segregating step being defined for at least one subscriber of said plurality by selection by said one subscriber from a visual display menu.

15. The telecommunications method of claim 10, wherein:

said segregating step being defined for at least one subscriber of said plurality by selection by a system administrator in said telecommunications network.

16. The telecommunications method of claim 10, wherein:

said first call processing characteristic is a subscriber language preference which different from that of call processing characteristics associated with subscribers outside of said first affinity group.

17. The telecommunications method of claim 10, wherein:

said first call processing characteristic is an abbreviated dialing list which is different from that of call processing characteristics associated with subscribers outside said first affinity group.

18. The telecommunications method of claim 10, wherein:

said first broadcast message is received by subscribers in said first group.

19. A telecommunications network serving a plurality of subscribers, comprising:

an affinity group table storage at a node in the network, for storing first call processing information for a first subplurality of said subscribers in a first affinity group, wherein said first information includes a first dial tone for playback to said subscribers in said first affinity group; and a call processor coupled to said storage, for performing first call processing operations using said first information in response to a first call by a subscriber in said first affinity group.

20. The telecommunications network of claim 19, which further comprises:

an affinity group network platform in said telecommunications network, for providing said affinity group table storage and said call processor; and a plurality of control processors distributed in said network and coupled to said network platform, for performing call screening of said first calls and transferring them to said call processor.

21. The telecommunications network of claim 19, which further comprises:

a plurality of said storages distributed in said telecommunications network, for storing said affinity group table;

a plurality of said call processors distributed in said network, each coupled to a respective one of said plurality of storages.

22. The telecommunications network of claim 19, wherein:

said first information includes a first special broadcast message for transmission to subscribers in said first affinity group.

23. The telecommunications network of claim 19, wherein:

said first information includes a first language preference for subscribers in said first affinity group.

24. The telecommunications network of claim 19, wherein:

said first information includes a first abbreviated dialing list for subscribers in said first affinity group.

25. The telecommunications network of claim 19, wherein:

said first information includes a first speech recognition word list for subscribers in said first affinity group.

26. The telecommunications network of claim 19, wherein:

said first information includes a first message queue storing a plurality of first special broadcast messages for selective transmission to subscribers in said first affinity group.

* * * * *